United States Patent [19]

Sayles

[11] Patent Number: 5,299,770

[45] Date of Patent: Apr. 5, 1994

[54] SAFETY SHIELD USABLE AT MULTIPLE WORK STATIONS

[76] Inventor: Philip W. Sayles, 172 Sycamore St., Watertown, Mass. 02172

[21] Appl. No.: 38,822

[22] Filed: Mar. 29, 1993

[51] Int. Cl.⁵ ............................................. A47F 5/00
[52] U.S. Cl. ................... 248/281.1; 248/123.1; 248/280.1
[58] Field of Search .................. 248/281.1, 280.1, 282, 248/283, 284, 289.1, 291, 292.1, 123.1, 122, 125, 276

[56] References Cited

U.S. PATENT DOCUMENTS

| | | | |
|---|---|---|---|
| 1,656,777 | 1/1928 | Dennis | 248/122 X |
| 3,994,464 | 11/1976 | Perbal | 248/280.1 |
| 4,160,536 | 7/1979 | Krogsrud | 248/123.1 X |
| 4,548,373 | 10/1985 | Komura | 248/122 |
| 4,653,715 | 3/1987 | Schmidt | 248/122 X |
| 4,852,842 | 8/1989 | O'Neil | 248/123.1 X |

FOREIGN PATENT DOCUMENTS 499061  1/1939  United Kingdom ............. 248/123.1

*Primary Examiner*—J. Franklin Foss
*Attorney, Agent, or Firm*—William Nitkin

[57] ABSTRACT

A face-protective safety shield supported on arms held to a base including an angularly positionable transparent panel to be disposed in a parallel plane to a worker for use at multiple work stations including work stations that are not disposed directly in front of the base of the safety shield.

3 Claims, 3 Drawing Sheets

SAFETY SHIELD USABLE AT MULTIPLE WORK STATIONS

BACKGROUND OF THE INVENTION

1. Field of the Invention

The device of this invention resides in the area of safety shields and more particularly relates to a transparent protective panel which is supported in front of a worker's face for protection of his face and eyes.

2. Description of the Prior Art

Workers in a work environment dealing with hazardous substances require protection from facial contact with such substances. For example, a worker in the medical field testing bodily fluids must avoid inadvertent contact with such fluids which fluids might be contaminated with various diseases and thus infect the worker. It is especially important to protect a worker's eyes from contact with contaminated or disease-carrying bodily fluids since a worker can contract a disease more easily through contact with the eyes than by direct contact with the skin. To protect workers doing testing of bodily fluids safety shields are often provided which shields, the transparent panels of which are supported on extendable arms. The transparent panels of such safety shields can be adjusted up and down in front of the worker's face as the worker sits in a chair at a work station generally disposed in front of the base of the support arms of such safety shield. When the transparent panel has been positioned to the requirements of the worker, the worker can then reach around behind the transparent panel with his hands to perform testing on the bodily fluids. A typical example of a prior art safety shield is found in U.S. Pat. No. Des. 315,229 to Shufelt which discloses a safety shield mounted on two extendable arms which shield can be manipulated both up and down in front of a worker and can be tilted to be at a position directly in front of the face of the worker.

SUMMARY OF THE INVENTION

It is an object of this invention to provide an improved safety shield which not only can perform the functions of prior art shields but also can be utilized at multiple work stations.

Prior art safety shields generally are adjustable in front of only one seat at a work station, being the seat directly in front of the base of the unit. In many instances it would be helpful for cost and space requirements to have one safety shield which could be alternately moved to a position in front of more than one work station for use by a worker at an adjacent work station. In some instances test equipment may prevent the positioning of a safety shield's arms and base directly in front of the worker, and it would then be desirable to use the device of this invention so that the base of the arm structure supporting the shield can be offset to one side from the seat of the work station and yet still protect the worker by the ability of the device of this invention to provide an angular disposition of its transparent panel to be directly in front of the face of the worker. It is therefore an object of this invention to provide a mechanism in the structure of the safety shield which will allow the angular positioning of the transparent panel of the safety shield in relation to the linear direction of its arm support structure so that the arm support structure can be angled toward the work station and the transparent panel then moved at an angle to the linear direction of the arm support structure while still being manipulable up and down and to various vertical tilted positions. This new angular movability of the transparent panel of the safety shield of this invention allows it to protect workers located at multiple work stations although protecting only one worker at a time at any given work station.

The safety shield of this invention utilizes the typical arm structure of prior art safety shields which have spring members tensioning an upper and lower arm member such as commonly found on adjustable light fixtures and which arm structures are well known in the prior art. The arms of the safety shield of this invention are hinged together. One end of the lower arm member is attached to a base member which is fixed securely to the work table of a work station. A transparent panel is provided which in the device illustrated is oval in shape and can be adjusted to be placed in front of a worker's face. It is the structure at the junction between the upper arm and the transparent panel which is the subject of the invention herein. The transparent panel has handle members at its top and bottom which can be grasped for tilting the panel. In the device of this invention the junction structure between the end of the upper arm and the transparent panel allows the transparent panel to be angularly disposed to the linear direction of the arms so that the transparent panel can be maneuvered to a variety of angularly disposed positions. The structure that is utilized to provide such angular movement to the transparent panel has a receipt member which is attached at one end to the end of the upper arm into which an L-shaped brace member is positioned and securely retained but yet is still rotatable by manual force within the receipt member. By rotation of the L-shaped brace which at its other end is attached to the upper portion of transparent panel, one can dispose the transparent panel at a variety of angles to service one of a multiple of work stations so that the safety shield of this invention can be used alternately at a number of adjacent work stations.

DESCRIPTION OF THE PREFERRED EMBODIMENT(S)

Figure 1:
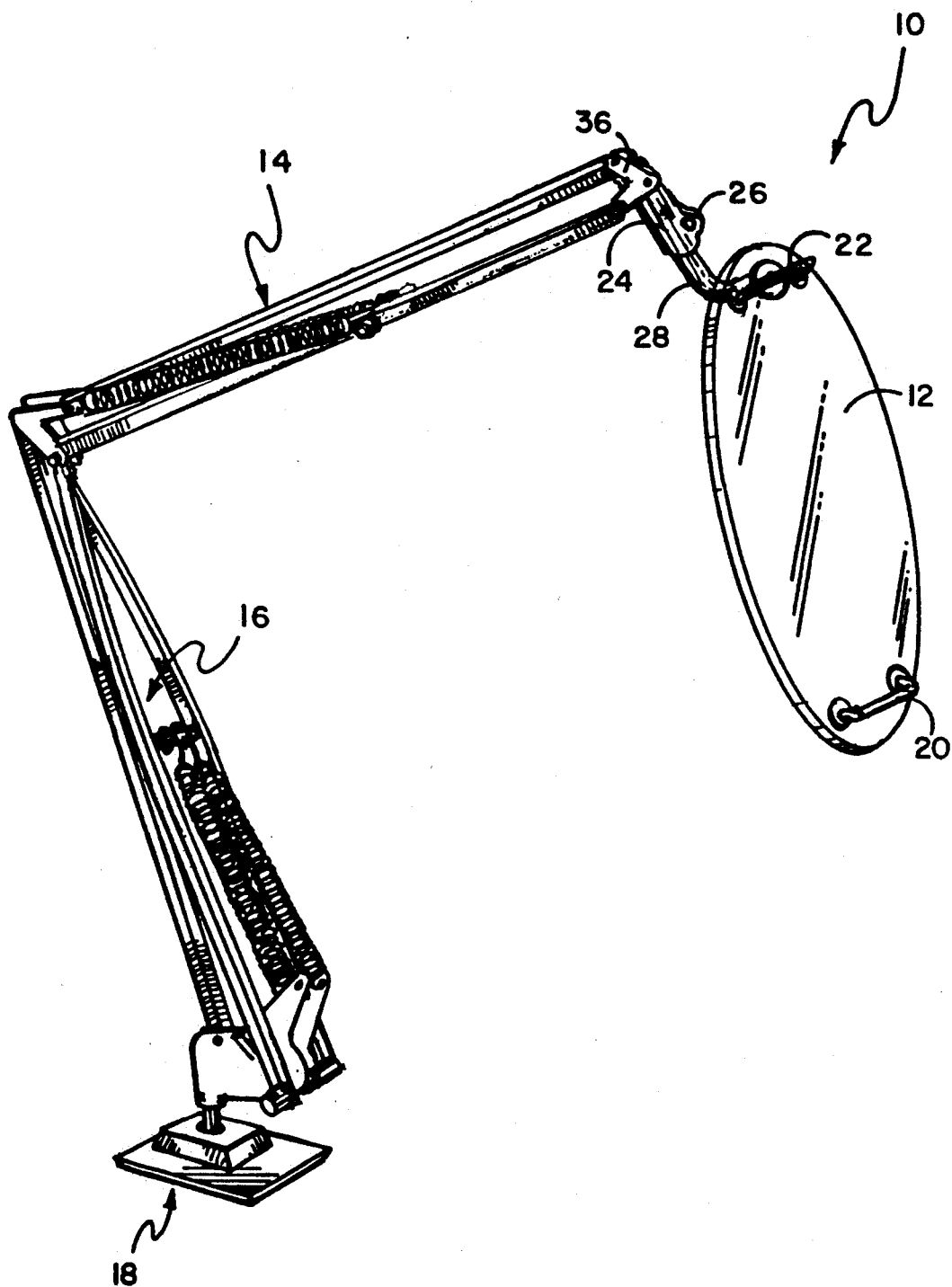
FIG. 1 illustrates a perspective view of the device of this invention with the transparent panel disposed directly in front of its base.
Figure 2:
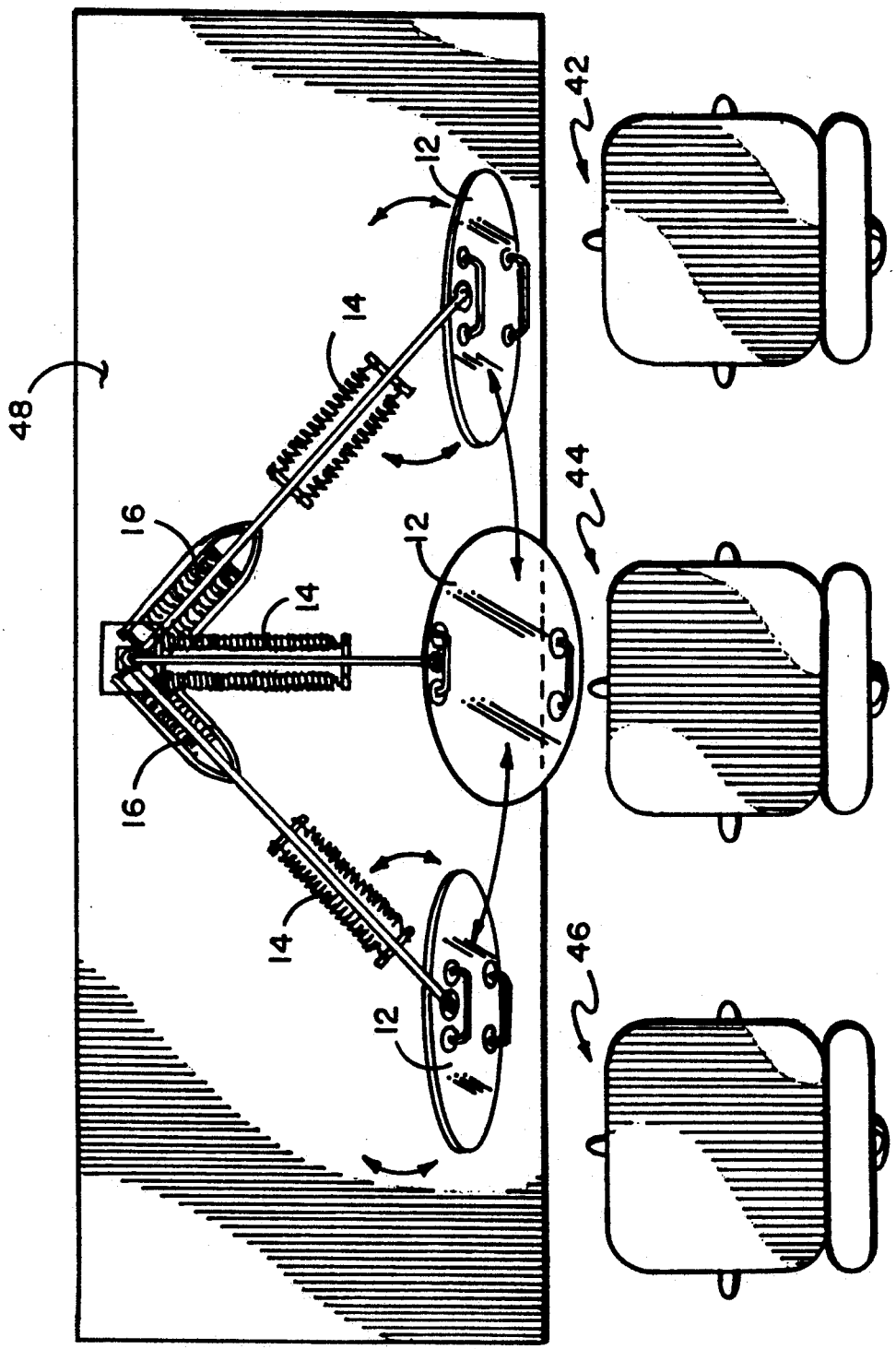
FIG. 2 illustrates a perspective top view of the device of this invention seen in multiple positions disposed for use alternately in front of three work stations, showing the angular disposition of the transparent panel to the linear direction of the arms.
Figure 3:
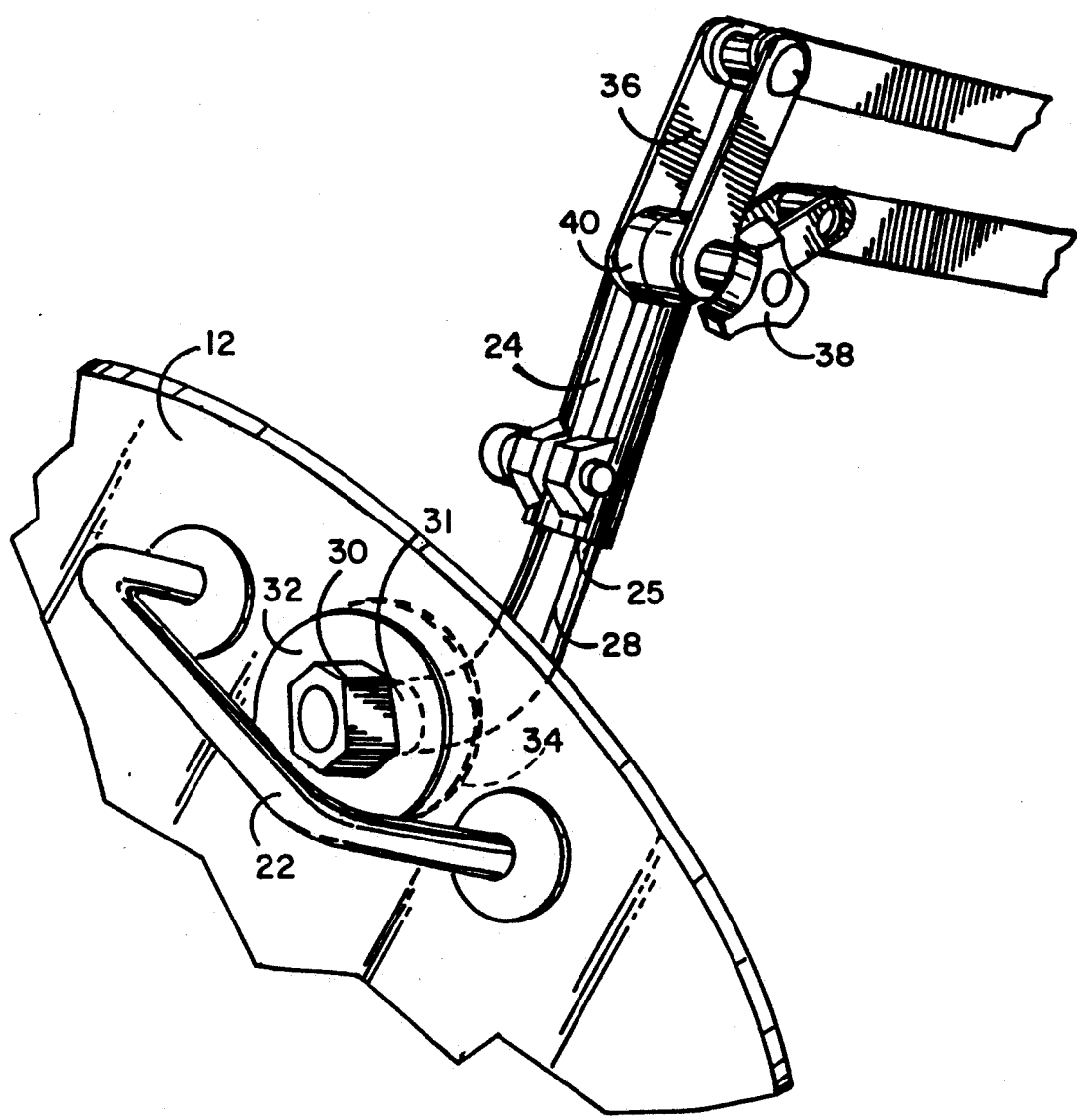
FIG. 3 illustrates a perspective close-up view of the mechanism which enables the multi-angular movement of the transparent panel of the safety shield of this invention.

FIG. 1 illustrates a perspective view of safety shield 10 of this invention. Seen in this view are the two arms, upper arm 14 and lower arm 16, which are joined together and spring-loaded. One end of the lower arm is attached to base 18 which base 18 is securely mounted to the table of a work station. At the end of upper arm 14 furthest away from the base is disposed arm end fixture 36 which has receipt member 24 attached thereto. Receipt member 24 having side portions has an aperture 25 defined therein and tightening means 26 which can be a screw member to make such aperture 25 larger or smaller. Tightening means 26 pulls the side portions of receipt member 24 together, thereby narrowing the diameter of aperture 25. Aperture 25 of receipt member 24 receives therein the first end, being the first leg of L-shaped brace 28. The first end of L-shaped brace 28, being a cylindrical portion, is inserted into round aperture 25 of receipt member 24. Receipt member tightening means 26 is tightened so that the first end of L-shaped brace 28 is securely held therein but is still rotatable my manual force applied thereto. L-shaped brace 28 can be rotated back and forth within receipt member 24. The second end of L-shaped brace 28 can have threads disposed thereon and be passed through panel aperture 31 formed in the top of transparent panel 12 which features are seen in greater detail in FIG. 3 showing front washer 32 and rear washer 34 helping to retain the L-shaped brace in position. The threaded portion of L-shaped brace 28 can be of narrower diameter than the diameter of the body of brace 28. Rear washer 34 passes over the threads and up to the body of brace 28 and is stopped by the body of L-shaped brace 28. Rear washer 34 is securely held against transparent panel 12 when nut 30 is threaded on the end of brace 28 over front washer 32 disposed on the other side of transparent panel 12 and tightened thereagainst which then securely retains transparent panel 12 on the end of brace 28. Also seen in FIG. 3 is upper handle 22. A lower handle 20 can also be disposed on transparent panel. 12 which dual handles enable one to easily tilt the transparent panel up and down by first loosening knob 38 on arm end fixture 36 which loosening allows up and down rotation of upper portion 40 of receipt member 24. The first end of the first leg of L-shaped brace 28 is rotatably inserted into aperture 25 of receipt member 24 and this configuration allows transparent panel 12 to be angularly rotated to the right or to the left through a range of movement of approximately 180 degrees. In FIG. 2 there is only one safety shield that is illustrated for use at three possible work stations to which it can be positioned and utilized. This multiple positioning of the safety shield of this invention is illustrated in FIG. 2 wherein if the safety shield is used at center work station 44, upper arm 14 is seen holding the transparent panel straight in front of the worker and the worker would be positioned directly perpendicular to the linear direction of the arms. The transparent panel can be moved up and down by the action of the upper and lower arms and also can be tilted by loosening knob 38 and moving the transparent panel. If it is desired to utilize the safety shield at a work station to the right of the center work station such as right work station 42, arms 14 and 16 can be extended at an angle toward right work station 42 and the transparent panel then manually rotated, thereby rotating the engaged leg of L-shaped brace 28 within receipt member 24. This angular movement allows transparent panel 12 to be then disposed directly in a parallel plane to the front of a worker sitting at right work station 42. The transparent panel of the safety shield can also be tilted to the desired position after it has been angularly positioned in front of the desired work station. In a similar manner the transparent panel can be rotated to a position in a parallel plane to the front of a worker at left work station 46.

It should be noted that the safety shield of this invention can be used at work stations in both industrial settings as well as medical settings.

Although the present invention has been described with reference to particular embodiments, it will be apparent to those skilled in the art that variations and modifications can be substituted therefor without departing from the principles and spirit of the invention.

I claim:

1. An improved face-protective safety shield for utilization by a worker at a work station, said safety shield of the type supported by an upper arm having first and second ends and a lower arm having first and second ends, said first end of said upper arm attached to the second end of said lower arm and said first end of said lower arm attached to a base, said second end of said upper arm attached to an arm support bracket, said arms having a linear direction, comprising:

a transparent panel having an upper portion;

affixation means to affix said arm support bracket to said transparent panel including tilting means to tilt said transparent panel up and down and rotation means to angularly rotate said transparent panel to be positioned at an angle to the linear direction of said arms and in a parallel plane to the face of said worker for said safety shield to be utilized at multiple work stations including work stations that are not disposed directly in front of the base of said safety shield, said rotation means to angularly rotate said transparent panel including:

a receipt member having a circular aperture defined therein, said receipt member retained by said arm support bracket;

an L-shaped brace having first and second legs being cylindrical in shape, said first leg inserted into the circular aperture of said receipt member and rotatably retained therein and said second leg of said L-shaped brace engaged to said upper portion of said transparent panel and held thereto; and wherein said receipt member further includes tightening means to adjustably and rotatably retain said first leg of said L-shaped brace in said receipt member aperture.

2. The device of claim 1 wherein said transparent panel further includes an aperture defined in the upper portion thereof;

the second leg of said L-shaped brace having an end portion being circular in shape and having a diameter with screw threads disposed on said end portion forming a threaded portion, said threaded portion having a narrower diameter than the diameter of said second leg of said brace which threaded portion is disposed through said aperture in said transparent panel; and a nut member threaded onto said threaded portion of said second leg of said L-shaped brace, said nut member securely retaining said transparent panel to the second leg of said L-shaped brace.

3. An improved face-protective safety shield for utilization by a worker at a work station, said safety shield of the type supported by an upper arm having first and second ends and a lower arm having first and second ends, said first end of said upper arm attached to the second end of said lower arm and said first end of said lower arm attached to a base, said second end of said upper arm attached to an arm support bracket, said arms having a linear direction, comprising:

a transparent panel having an upper portion;

affixation means to affix said arm support bracket to said transparent panel including tilting means to tilt said transparent panel up and down and rotation means to angularly rotate said transparent panel to be positioned at an angle to the linear direction of said arms and in a parallel plane to the face of said worker for said safety shield to be utilized at multiple work stations including work stations that are not disposed directly in front of the base of said safety shield;

wherein said rotation means to angularly dispose said transparent panel of the safety shield includes;

a receipt member having a circular aperture defined therein, said receipt member retained by said arm support bracket; and an L-shaped brace having first and second legs being cylindrical in shape, said first leg inserted into the circular aperture of said receipt member and rotatably retained therein and said second leg of said L-shaped brace extends through said transparent panel.

* * * * *